W. Brown,
Tube Stopper.
No. 100,115. Patented Feb. 22, 1870.
Fig: 1. 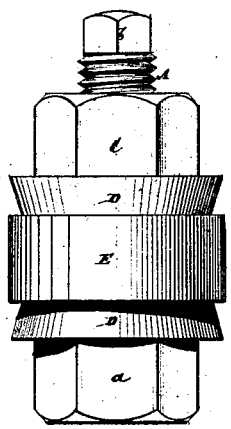
Fig: 2. 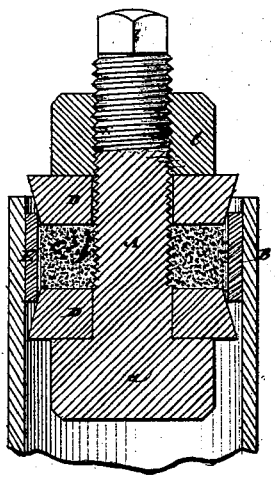
Witnesses:
Fred. Haines
Ferd Tuech
Inventor
William Brown

United States Patent Office.

WILLIAM BROWN, OF HOBOKEN, NEW JERSEY.

Letters Patent No. 100,115, dated February 22, 1870.

IMPROVEMENT IN TUBE-STOPPER

The Schedule referred to in these Letters Patent and making part of the same.

*To all whom it may concern:*

Be it known that I, WILLIAM BROWN, of Hoboken, in the county of Hudson, and State of New Jersey, have invented a new and useful Improvement in Tube-Stoppers, of which the following is a full, clear, and exact description, reference being had to the accompanying drawing forming part of this specification, and in which—

Figure 1 represents an outside longitudinal view of a tube-stopper constructed in accordance with my improvement, and Figure 2 a longitudinal section of the same as applied to a tube, shown only in part.

Similar letters of reference indicate corresponding parts.

My improvement consists in a certain combination of a bolt and nut with reversed cones or truncated devices, and a packing-ring, arranged so that on screwing up the nut the cones are made to act upon the ring from opposite sides, to expand or spread it, and thereby cause the same to close or stop the tube; also, the invention embraces, in combination with the elements just recited, a chamber, arranged between the truncated ends of the cones, filled with red lead or other suitable cement, whereby, on screwing up the nut, the cones are made to force out the cement, to effect a more perfect sealing or closing of the stopper.

Said invention is applicable, among other purposes, to the stopping of locomotive-boiler tubes and to condenser-tubes. When applied to stopping the tubes of condensers, or other tubes not exposed to a high heat or steam-pressure, the ring that operates to stop or close the tube may be made of lead or other readily compressible metal or alloy, and whole or in one piece, but when the stopper is applied to the tubes of steam-boilers, or other tubes exposed to a high degree of heat, then said ring should be of a harder or less fusible metal or alloy, and should be split or divided, as packing-rings for other purposes have been made, such joint or split preferably not being in a direct or straight line with the tube, or two rings may be used with straight divisions in them arranged to break joint.

In the accompanying drawing—

A represents a screw-bolt, the head *a* of which, in applying the stopper, occupies an interior position within the mouth of the tube B, the stopper is designed to close.

The outer end of said bolt is formed with a square or other suitably-shaped extremity, *b*, for the purpose of applying a wrench to keep the bolt from turning while the nut C is being screwed up or slackened, as the case may be.

Fitted on or over the bolt, between its head *a* and the nut C, are two cones or truncated devices D D, arranged with their truncated ends to face each other, and so that they fit within a lead or other suitable packing-ring, E, leaving a chamber, F, between them, which may be filled with red lead or other suitable cement *c*.

The outer one of the cones D should be fitted to move freely on the bolt, under the action of the nut C, while the inner cone takes its bearing against the head *a* of the bolt.

By screwing up the nut C, the ring E is expanded by the action of the cones D D on the opposite sides of it, so as to stop the tube, the closing of which may be yet more effectually secured by the cones, as their truncated ends approach each other, being caused to squeeze or express out of the chamber F and around the edges of the rings, or through its joint when divided, a certain amount of the red lead or cement *c*, so as to effect a perfect sealing of the stopper.

What is here claimed and desired to be secured by Letters Patent, is—

1. The combination and arrangement of the bolt A, with its nut C, the reversely arranged cones D D, and the packing-ring E, substantially as and for the purpose herein set forth.

2. The chamber F, arranged between the truncated ends of the cones, and filled with suitable cement, in combination with said cones D D, the packing-ring E, bolt A, and nut C, essentially as shown and described.

WILLIAM BROWN.

Witnesses:
FRED. HAYNES,
HENRY PALMER.